United States Patent
Bernard

[11] 3,787,067
[45] Jan. 22, 1974

[54] SAFETY VALVE WITH INERTIAL OPENING CONTROL

[75] Inventor: Jean Paul Bernard, Paris, France

[73] Assignee: Societe Anonyme Aerazur Constructions Aeronautiques, Issy-Les-Moulineaux, France

[22] Filed: Nov. 18, 1971

[21] Appl. No.: 199,997

[30] Foreign Application Priority Data
Nov. 18, 1970 France.................70.41379

[52] U.S. Cl............. 280/150 AB, 137/39, 137/50, 222/3, 251/76
[51] Int. Cl.......................................... B60r 21/08
[58] Field of Search.... 280/150 AB; 137/38, 39, 50; 222/3; 141/4; 251/76

[56] References Cited
UNITED STATES PATENTS

| | | | |
|---|---|---|---|
| 3,674,059 | 7/1972 | Stephenson.............. | 141/4 |
| 3,628,550 | 12/1971 | Cirillo................... | 137/38 |
| 3,706,463 | 12/1972 | Lipkin................... | 137/38 |

Primary Examiner—David Schonberg
Assistant Examiner—John P. Silverstrim
Attorney, Agent, or Firm—Sughrue, Rothwell, Mion, Zinn and Macpeak

[57] ABSTRACT

A safety valve is provided whose opening is controlled by the movement of a piston that responds to an inertial force. The valve includes a tubular body having a discharge opening at one end an evacuation opening at the other end, and a fluid inlet situated in the lateral wall. A piston is slidably arranged within the tubular body so as to close the discharge opening at one end, but to permit communication between the inlet, an evacuation opening at the other end. A compression spring is mounted in the tubular body so as to continually push the piston toward the discharge opening, in order to keep the evacuation opening open. Upon the application of an inertial force, the piston will slide towards the evacuation opening and open the discharge opening for permitting the egress of gas. The valve can be arranged for use in inflation devices, such as air bags, for automotive vehicles.

5 Claims, 1 Drawing Figure

PATENTED JAN 22 1974  3,787,067
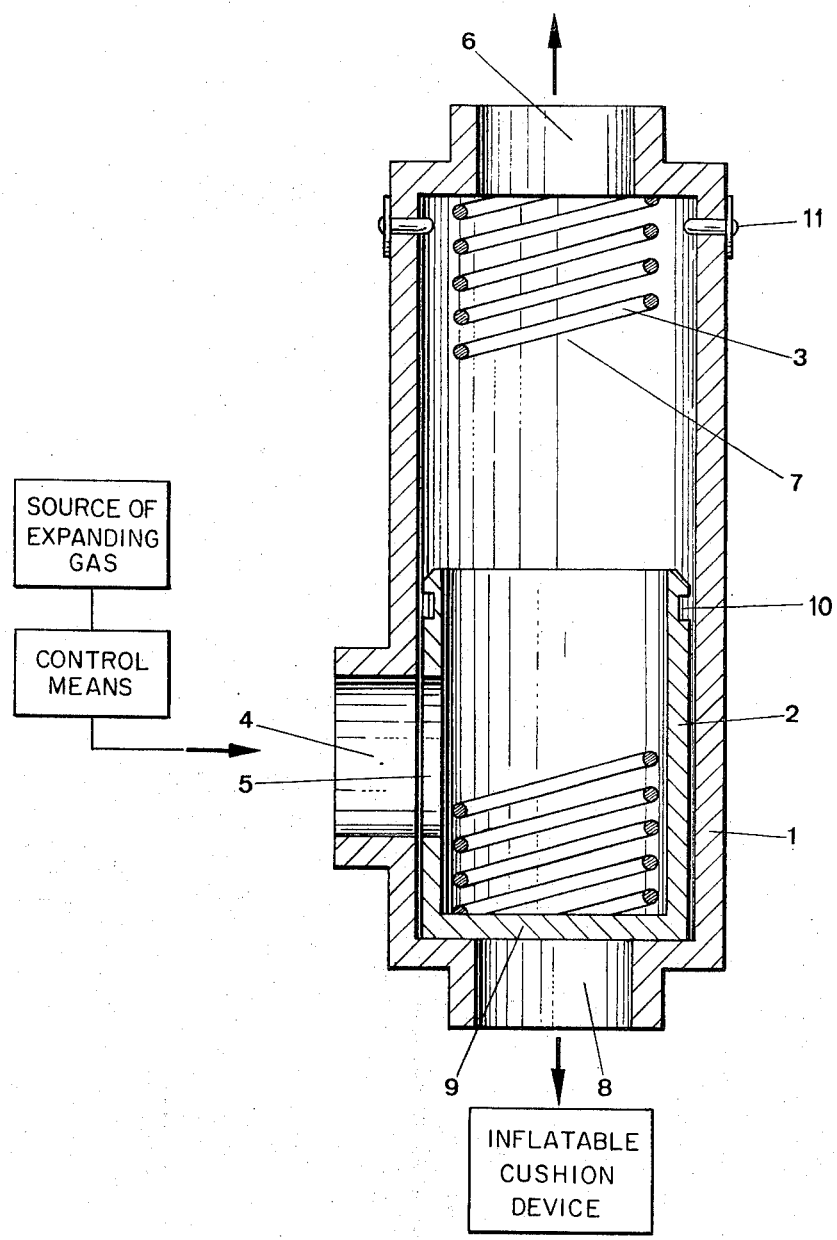

SAFETY VALVE WITH INERTIAL OPENING CONTROL

BACKGROUND OF THE INVENTION

1. Field of the Invention

The present invention relates to valves having an opening controlled by inertia and, more particularly, relates to a safety valve operable in an inflation system for an anti-collision cushion or air bag in an automobile.

2. Description of the Prior Art

Anti-collision cushions or air bags in automobiles are designed to be operated by an inertial force created by a substantially instantaneous deceleration that occurs upon a collision or accident. In the present state of the art of automobiles, it has been suggested to utilize various safety devices for protecting passengers of the vehicle in the case of collision, such as seat belts and also inflatable baloons or cushions which are designed to hold the passengers in their seats and, at the same time, act as shock absorbers for the passengers in case the vehicle should stop abruptly after hitting an obstacle or after becoming involve in a collision with another vehicle. These inflatable cushions or air bags are generally connected by means of a pipeline to a source of gas, or a gas discharge control device, which acts as a generator for furnishing the gas. It has been found that, for these cushions to be truly effective, they must be inflated almost instantaneously, that is to say, with a very great speed which in effect makes their inflation very much like an explosion. It has been noted, furthermore, in the course of tests on such air bags, that, when a cushion inflates, its expansion speed is such that it may fling the passenger facing it backward and injure him seriously by slamming him into the back of his seat, if this passenger, at the particular instant, is leaning too far forward. Because of the hazards associated with these air bags, it is important that inflation should not occur unexpectedly, or as a result of a slight collision, that is to say, at reduced speeds.

The control device which generally controls the inflation of the air bags is usually sensitive to the deceleration of the vehicle, and acts upon a pyrotechnical cartridge. It has been found that the possibility of a premature or inadvertent operation of such a pyrotechnical cartridge is a constant threat to the passengers, as well as to the driver, and particularly to those people who are subject to nervous tension due to both the sudden expansion of the cushion device and the accompanying noise.

As a result of these inconveniences in inflation devices of the prior art, adapted for use on such anti-collision protection cushions or air bags, this present invention proposes, among other objects, to eliminate the risk of unexpected inflation of these cushions by providing for the incorporation of a safety valve designed so that, when it is at rest, it will be in a closed position and can only become operative in case of an abrupt impact or stoppage, for example, due to the collision of a vehicle which carries it, while on the other hand, in the case of an unexpected expulsion of inflating gas, the safety valve will permit the evacuation of this gas into the atmosphere without even permitting a minor penetration into the corresponding cushion or air bag.

According to the invention, such a safety valve is characterized by the fact that it comprises a tubular body carrying a discharge opening at one end and an evacuation opening at the other end with an intermediate inlet opening situated in its lateral wall in the proximity of the discharge outlet opening. A piston is positioned in the tubular body in a sliding relationship and is arranged so as to normally close the discharge opening while permitting communication between the lateral inlet opening and the evacuation opening. A compression spring is mounted in the tubular body to bias the piston towards the discharge opening so as to keep the latter closed in the normal resting position of the safety valve.

This piston may be provided in a cylinder or tubular form closed at its end corresponding to the discharge opening and containing in its wall a hole so situated so as to correspond to the inlet opening when its closed end is supported or resting against the discharge opening. The tubular body is provided with sufficient internal length to permit the piston, when it recoils and releases the discharge opening, to be able to completely release or clear the inlet opening in the lateral wall. The compression spring is supported at one end in the interior of the tubular body near the side of the evacuation opening and at its other end it is engaged in the piston resting on the closed end. The spring is so calculated that it will not be appreciably moved by a low inertial force of the piston that can be occasioned by a more or less progressive deceleration of the vehicle such as an emergency braking by the operator, however, upon a sudden stopping that would occur, upon for example a collision, the spring will yield and be compressed due to the inertial force of the piston produced by the abrupt and instantaneous stoppage of the vehicle and permit the gas to pass from the inlet opening in the lateral wall, through the discharge opening of the valve.

The spring may be calibrated in such a manner that the recoil value of the piston will be essentially proportioned to the violence of the shock undergone in the source of the collision, so that the piston will release or clear the inlet opening only partly and following this position the gas will be distributed between the discharge opening and the evacuation opening. Finally, the tubular body can be provided with an arresting or stopping device, for example in the form of a strip-shaped spring with a catch or trigger so arranged as to engage an annular groove formed within the piston wall, thereby preventing the return of the piston to its initial position after a partial recoil movement. The evacuation opening may also be equipped with a device that will absorb the pressure of the gas, for example, in the form of baffle plates.

BRIEF DESCRIPTION OF THE DRAWINGS

Other objects and features of the present invention will emerge during the following description of the example of this invention, taken in conjunction with the attached drawings which schematically illustrate a safety valve in an axial cross-sectional view.

DESCRIPTION OF THE PREFERRED EMBODIMENT

Referring to the drawings, the valve, according to the invention, consists of a tubular body 1 in which a piston 2 can slide, although it is held back by a compression spring 3. The tubular body is shown in the form of a single block so as to facilitate understanding, whereas one of its ends is necessarily mounted in a removable manner, so as to permit the insertion of this piston and the spring, and possibly also to facilitate the replacement. This tubular body 1, at one end, has an evacuation opening 6 and, at its other end, has a discharge opening 8 which ordinarily is closed off by the piston 2. The tubular body 1 further has an inlet opening 4 in its lateral wall situated in the proximity of the discharge opening 8. The piston 2 likewise has a tubular shape, but it is closed by a bottom or back wall 9 so arranged as to be supported on the periphery of the discharge opening 8 and, by virtue of this fact, close it. This piston, in its lateral wall, has a hole 5 which essentially has the same diameter as the inlet opening 4 and which is situated so as to correspond to the latter when the piston is supported upon the periphery of the discharge opening 8 in this position, the inlet opening 4 is in communication with the evacuation opening 6. The spring 3 is supported at one end upon the internal peripheral portion of the evacuation opening 6, and at its other end, it is engaged in the tubular part of the piston 2, thereby urging the bottom wall 9 of the piston against the periphery of the discharge opening 8. This spring has the form of a helicoidal compression spring, so calibrated and stressed as to push the piston effectively toward the discharge opening 8, in order to close the latter, but to yield under a preset inertial recoil force of the piston, allowing the piston to clear the inlet opening 4 in order to put it into communication with the discharge opening 8. It should be noted that, according to the invention, this spring 3 can also be calibrated so that the piston will be able to recoil only progressively or gradually, so as to partially release or clear the inlet opening 4, so that communication will be established between this opening and both the evacuation and discharge openings, thereby dividing the fluid flow. Hole 5 of the piston is situated near bottom wall 9 and in such a manner that, when the bottom wall 9 for example is in the middle position with regard to the inlet opening 4, that is, when the bottom wall 9 is in a halfway position at inlet opening 4, hole 5 can still be in communication with the inlet opening 4 although it is also, at this particular instant, in communication with the discharge opening 8. Furthermore, the tubular body 1 of the valve is provided with sufficient internal length so as to place the piston in its maximum recoil position as shown at point 7 in the figure, so that it will totally release the inlet opening 4.

In such an inflatable device, such as an air bag, the valve is mounted so that its tubular body will be arranged essentially horizontally with the end that is by the side of the evacuation opening 6 in the forward direction of the vehicle so that, if the vehicle should abruptly decelerate, an inertial force would be created by the piston and would force it to recoil, that is to say, would move it away from the periphery of the discharge opening 8 upon which it is normally supported. The inlet opening 4 is connected to a fluid source or generator such as, for example, a source of exploding gas, and the discharge opening 8 is connected to the inflatable protective cushion or air bag. Evacuation opening 6 has the shape of an escape hole and is in communication with the atmosphere and also can include a device for the absorption of the flow of evacuated gas, for example, in the form of baffle plates which provide for the latter's lamination, in order to prevent this gas from constituting a threat to the vehicle passengers. It should be noted that an arresting or stopping device, for example in the form of a strip-shaped spring with a catch, 11 adapted to engage an annular groove 10 formed within the piston wall 5, is provided in the tubular body 1 of the valve in order to restrain the piston 2 in housing 7 in its recoil position.

The piston 2 is ordinarily forced by spring 3 so that its bottom 9 rests upon the internal periphery of discharge opening 8, thus forming a piston seat. In this position, the inlet opening 4 is in direct communication by means of the hole 5 in the piston with the evacuation opening 6 and, in case of an unexpected supply of inflation gas, the latter is evacuated toward the atmosphere, while the gas pressure furthermore helps the spring 3 to force the piston 2 against the discharge opening. In case of a very abrupt collision of the vehicle, the substantially instantaneous deceleration causes the formation of inertial force, which moves the piston toward the evacuation opening against the compression force of the spring, simultaneously with the release or discharge of gas from the source. The gas is directed from the inlet opening 4 toward the discharge opening 8, from where it penetrates into the cushion or air bag, causing its extremely rapid inflation. A mechanical arresting device such as 10, 11 is generally provided in order to prevent the piston from bouncing back; however, the gas pressure itself tends to keep the piston in its recoil position, and the calibration of the spring may be provided in sufficient strength to prevent such an effect.

This invention is not limited to the examples just described, but on the contrary, it is susceptible to variations and modifications which will occur to the expert in the field, and accordingly, the scope of the invention should be measured solely from the following claims.

What is claimed is:

1. An inflatable air cushion safety fluid system for controlling the expulsion of gas comprising:
   an inflatable cushion device;
   a source of expanding gas;
   a cylinder body having a discharge opening at one end, connected to the inflatable cushion device, and an evacuation opening at the opposite other end, the cylinder body further having a lateral fluid inlet opening adjacent the discharge opening;
   a piston slidably positioned within the cylinder body so as to close the discharge opening in its normal at rest position, the piston having a port in its lateral wall providing fluid communication between the lateral fluid inlet and the evacuation opening;
   a compression spring mounted in the cylinder body to bias the piston against the discharge opening, the valve is mounted so that a large inertial force will force the piston against the compression spring and permit fluid communication between the lateral fluid inlet opening and the discharge opening whereby the gas can inflate the cushion device; and
   means for controlling said source of expanding gas comprising a deceleration responsive control device which normally confines said gas to said source of expanding gas but which permits said gas to enter said cylinder body through said later fluid inlet therein when said means are subjected to a deceleration in a predetermined direction at least equal to a predetermined value.

2. An inflatable air cushion safety fluid system as in claim 1, wherein the piston has a tubular shape and is closed adjacent the discharge opening.

3. An inflatable air cushion safety fluid system as in claim 2, where the spring is positioned with the tubular shape of the piston and rests against the evacuation end of the cylinder.

4. An inflatable air cushion safety fluid system as in claim 2, where the opening of the lateral fluid inlet is of such a dimension in relationship to the position of the closed piston end and the piston port that communication can be provided from the lateral fluid inlet to both the discharge opening and the exhaust opening whereby expanding gas can flow to both openings.

5. An inflatable air cushion safety fluid system as in claim 4, where a safety catch is provided within the cylinder to maintain the piston in an open position when activated.

* * * * *